April 3, 1951 H. A. ENGELHARDT 2,547,259
EDUCATIONAL DEVICE
Filed Feb. 3, 1948
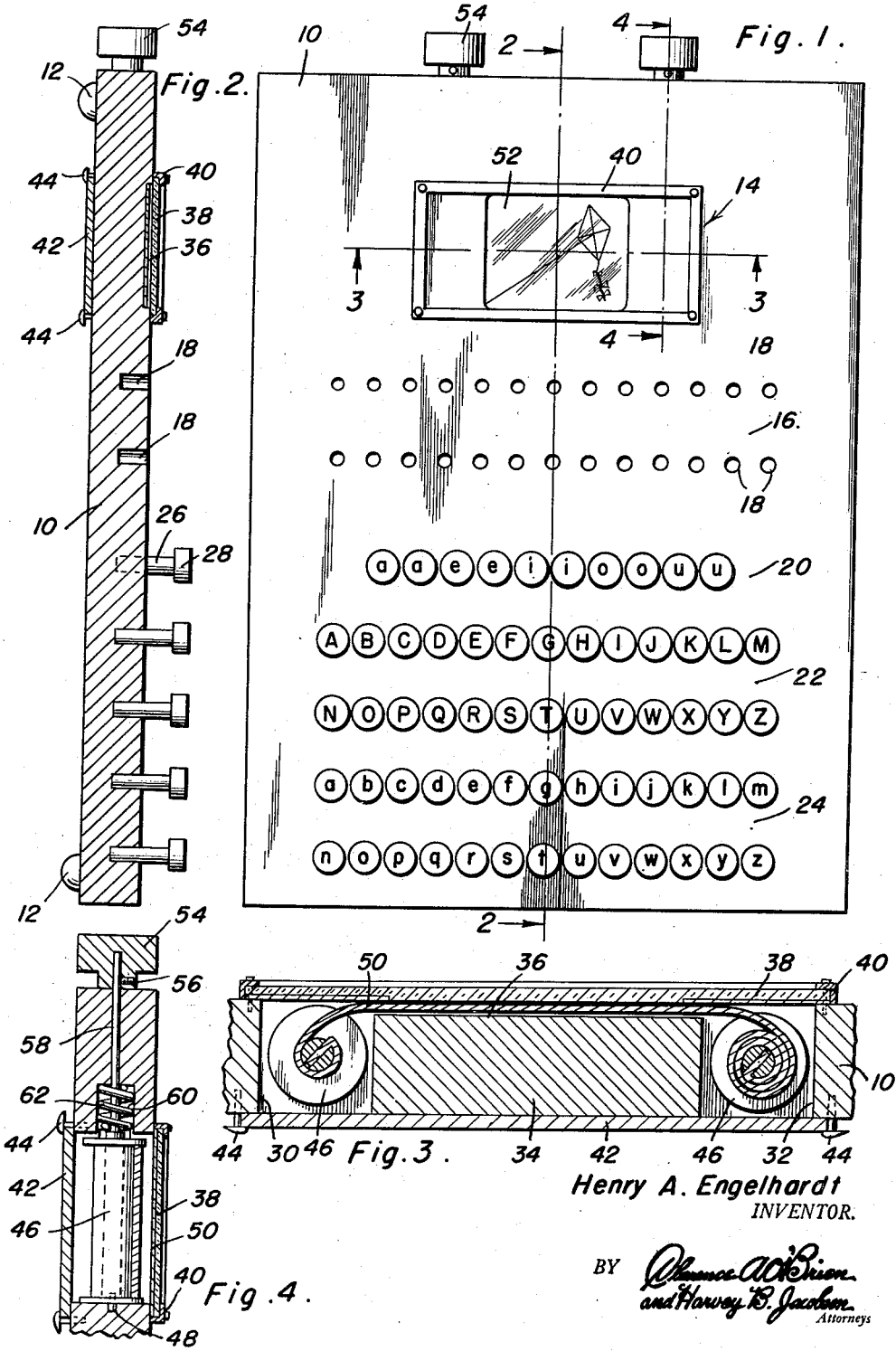
Henry A. Engelhardt
INVENTOR.

Patented Apr. 3, 1951

2,547,259

UNITED STATES PATENT OFFICE 2,547,259

EDUCATIONAL DEVICE

Henry A. Engelhardt, Garwood, N. J.

Application February 3, 1948, Serial No. 6,090

2 Claims. (Cl. 35—35)

This invention comprises novel and useful improvements in educational devices and more particularly pertains to a training device which is useful in teaching small children spelling in a scientific and amusing manner.

The principal object of the invention is to provide an educational aid which will stimulate the interest of a child; exercise his powers of observation; encourage the child in learning to spell and withal providing a source of amusement therewith.

The principal features of this invention consist in providing a board which may be conveniently mounted upon a vertical or horizontal supporting surface; which provides visual instruction for the child in the form of a series of pictorial indicia selectively displayed at an inspection window; in providing a zone for composition of words upon the board; in providing storage zones for lettered markers which may be selectively assembled in the composition zone for forming words such as those corresponding to the pictorial exhibits.

A further important feature of the invention resides in the provision of a magazine for receiving reels or spools upon which are wound a web bearing the indicia for observation; in providing novel means for changing, servicing and repairing the web means; and in providing an improved mechanism for moving the web to selectively exhibit the pictures thereon.

And a final important feature of the invention to be specifically enumerated herein resides in the provision of an educational aid or device which shall be of simple construction, attractive in appearance, inexpensive and easily manipulated.

These, together with various ancillary features and objects of the invention which will later become apparent as the following description proceeds, are attained by this device, a preferred embodiment of which has been illustrated by way of example only in the accompanying drawings, wherein:

Figure 1 is a front elevational view of a suitable embodiment of the educational device;

Figure 2 is a vertical transverse sectional view taken substantially on the section line 2—2 through the device;

Figure 3 is a fragmentary horizontal sectional detailed view taken upon an enlarged scale substantially in the plane of the section line 3—3 of Figure 1; and, Figure 4 is a vertical transverse sectional detailed view taken upon an enlarged scale substantially upon the plane of the vertical section line 4—4 of Figure 1.

Referring now more specifically to the accompanying drawings, wherein like numerals designate similar parts throughout the various views, there is disclosed by way of illustration of the principles of the invention a suitable embodiment of the device which includes a generally rectangular board 10 of any suitable material and shape, which may be provided with any suitable means for mounting the board upon the surface of a wall, such means not being shown, and also may be provided with rubber buttons 12 constituting supporting legs when the board is rested upon a substantially horizontal suppporting surface.

At any point, such as adjacent its upper portion, the board is provided with an inspection window indicated generally at 14 for exhibiting pictorial representations therebeneath as set forth hereinafter. Preferably immediately below the inspection window is a composition zone indicated by the numeral 16, which zone includes a plurality of means for receiving and retaining lettered markers in predetermined arrangements to form words, such as for example, the sockets 18. A plurality of supply zones 20, 22 and 24 which may also be in the form of sockets, are provided on the board for selectively receiving and presenting ready for inspection and use, a series of lettered markers respectively designating selected series of letters such as vowels, capital letters of the alphabet, or lower case letters of the alphabet respectively.

These markers, as shown best in Figure 2, preferably each consist of a stem portion 26 which is snugly but detachably received in any of the sockets upon the various zones of the board, and which stem portions are provided with an integral or if desired, a mechanically attached and separable head portion 28 bearing the various indicia thereon.

As will be readily understood, the child or the person learning to spell can selectively assemble various letters in the sockets 18 of the composition zone 16 to form various words, and it is contemplated that the presentation for visual inspection of a pictorial representation at the window 14 will stimulate interest in the selection and spelling of words which are appropriate or related to the representation.

Attention is now directed more particularly to Figures 3 and 4 for an understanding of the mechanism and means for selectively exhibiting the various pictorial indicia at the inspection window 14. As seen best in Figures 3 and 4 and also indicated in Figure 1, the board is provided with a slot or cavity 30 extending entirely therethrough from the front to its rear face. Preferably, a similar cavity 32 is provided slightly spaced from the cavity 30 as by an integral portion of the board 34 positioned therebetween. It is of course to be understood that if desired, the two cavities 30 and 32 may form a single large cavity, with the intermediate portion 34 being formed by a block disposed therebetween and separably attached therein.

At its rear side, the portion 34 or where employed the block interposed in the cavity, is recessed or cut away as at 36 in Figure 2 and a transparent window pane of any suitable material 38 is secured to the front surface of the board overlying the recessed portion 36 and the cavities 30 and 32 to form the window 14, this pane being retained as by a frame 40. The rear surface of the board is provided with a removable cover panel 42 of any suitable material which is detachably retained thereon as by the pivoted fasteners 44.

As is shown best by reference to Figure 3, a pair of spools or reels 46 are detachably journalled in the cavities 30 and 32 as by means of pintles 48, see Figure 4, upon one end of the reels being rotatably and detachably received in journalling sockets in the bottom wall of the cavities 30 and 32. A web 50 of any suitable material is provided with a pictorial representation such as that indicated at 52 in Figure 1, and is wound upon the reels 46 and disposed in the recessed channel 36 for successive and sequential display beneath the inspection window 14.

A feeding means is provided for selectively rotating the reels and for detachable engagement therewith. This means includes a pair of knobs or finger-grip members 54, which are positioned exteriorly of the board 10, and are provided with set-screws 56 for detachable engagement upon the extremity of a shaft 58 which latter is slidably and rotatably received in a bore extending from the exterior surface of the board 10 into the cavities 30 and 32. The inward extremity of the shaft 58 is engaged detachably by a longitudinal sliding movement of the shaft into a suitable socket in one end of the reels 46, to establish a releasable but non-rotatable driving engagement therewith. Any suitable means may be employed to effect this purpose, such as the provision of a keyed or splined engagement between the end of the shaft 58 and a socket portion of the reel 46.

Received in a chamber 60 opening from the cavities 30 and 32, is a spring 62 which surrounds each of the shafts 58 and yieldingly urges the shafts inwardly into engagement with the reels as above mentioned.

From the foregoing, the construction and operation of the web feeding mechanism will be readily understood. The rear cover plate 42 is removed in order to obtain access to the cavities 30 and 32, and by grasping the knobs 54, the rods 58 are drawn outwardly of these cavities against the opposition of the spring 62, whereby a dispensing reel and a receiving reel may be inserted in the cavities and journalled in their bearing sockets therein, whereupon the knobs may be released and the shafts 58 urged inwardly by their springs into non-rotatable and driving engagement with the reels. The rear cover plate may then be replaced and secured by the pivoted fastening means 44, whereupon by rotation of either of the knobs 54, the web may be selectively positioned to exhibit the desired pictorial representation beneath the window inspection opening 38. It will be noted that the recessed channel 36 provides means for permitting this sliding movement of the web over the block or portion 34 to thereby present the pictures in properly positioned relation to the inspection opening.

From the foregoing, it is thought that the manner of constructing and operating the device together with its advantages will be readily understood and further explanation is believed to be unnecessary. However, since numerous modifications and changes will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having described the invention what is claimed as new is:

1. In an educational device, a board having an enlarged vertical opening, a transparent plate secured in closure placement over the opening on the face of the board, a plate secured over the opening on the bottom of the board, a partition member carried by the bottom plate and positioned within the opening, said partition member defining chambers at its opposing side edges, reels rotatably removably journaled in said chambers, a web having pictorial representations formed thereon secured at its opposing ends to the reels, said web being movable over the partition member in vertical alignment with the transparent plate, means extending outwardly from the board for rotating said reels, said board having a composition zone including spaced rows of openings formed on the face of the board below the transparent plate, a plurality of pegs positionable in said opening, said pegs being formed with enlarged inscribed heads, and a storage zone formed on the board below the composition zone comprising spaced rows of apertures.

2. In an educational device, a board, a vertical well in said board, a transparent closure plate secured over said well, a partition member centrally secured in said well defining spaced chambers at its opposing side edges, reels rotatably removably journaled in said chambers, a roll of material having successive pictorial representations formed thereon secured at its opposing ends to the reels and movably disposed on the upper face of the partition member in vertical alignment with the transparent plate, operating shafts rotatably inserted in one of the ends of the board and detachably associated at their inner ends with the reels, resilient means for normally biasing said shafts into operative engagement with the reels, a composition zone comprising a plurality of openings formed on the face of the board below the transparent plate, a plurality of pegs adapted for detachable insertion in the composition zone, said pegs being formed with enlarged inscribed heads and a storage zone for said pegs below said composition zone comprising spaced rows of apertures for removably receiving said pegs.

HENRY A. ENGELHARDT.

REFERENCES CITED

The following references are of record in the file of this patent:

UNITED STATES PATENTS

| Number | Name | Date |
|---|---|---|
| 281,112 | Mitchel | July 10, 1883 |
| 296,900 | Wheeler | Apr. 15, 1884 |
| 723,022 | Pratt | Mar. 17, 1903 |
| 1,026,809 | Kraus | Mar. 21, 1912 |
| 1,110,434 | Garman | Sept. 15, 1914 |
| 1,559,665 | Beery | Nov. 3, 1925 |
| 1,891,414 | Hahn | Dec. 20, 1932 |
| 2,129,834 | Funk | Sept. 13, 1938 |
| 2,149,363 | Rivkin | Mar. 7, 1939 |
| 2,474,447 | Wheelock | June 28, 1949 |